United States Patent

[11] 3,588,320

[72] Inventor John Guzak, Jr.
Arlington Heights, Ill.
[21] Appl. No. 771,227
[22] Filed Oct. 28, 1968
[45] Patented June 28, 1971
[73] Assignee SCM Corporation
New York, N.Y.

[54] MODING CONTROL FOR A DATA COMMUNICATION SYSTEM

9 Claims, 1 Drawing Fig.

[52] U.S. Cl. .......... 178/2
[51] Int. Cl. .......... H04l 15/00
[50] Field of Search .......... 178/2

[56] References Cited

UNITED STATES PATENTS 3,395,245 7/1968 Harris .......... 178/2

*Primary Examiner*—Kathleen H. Claffy
*Assistant Examiner*—Thomas W. Brown
*Attorney*—Mason, Kolehmainen, Rathburn and Wyss

ABSTRACT: The application discloses a moding control for a telecommunication system by which data receivers, such as printers and punches, and data transmitters, such as tape readers and keyboard units, are selectively coupled to each other and to incoming and outgoing lines. The transmitters can be placed in online modes or in local modes coupled to local receivers, while three-state local, online, and monitor mode selectors are provided for the receivers. The moding control is exerted by manual selection coupled with logic circuits and is such as to inhibit any transmitter-receiver data interference.

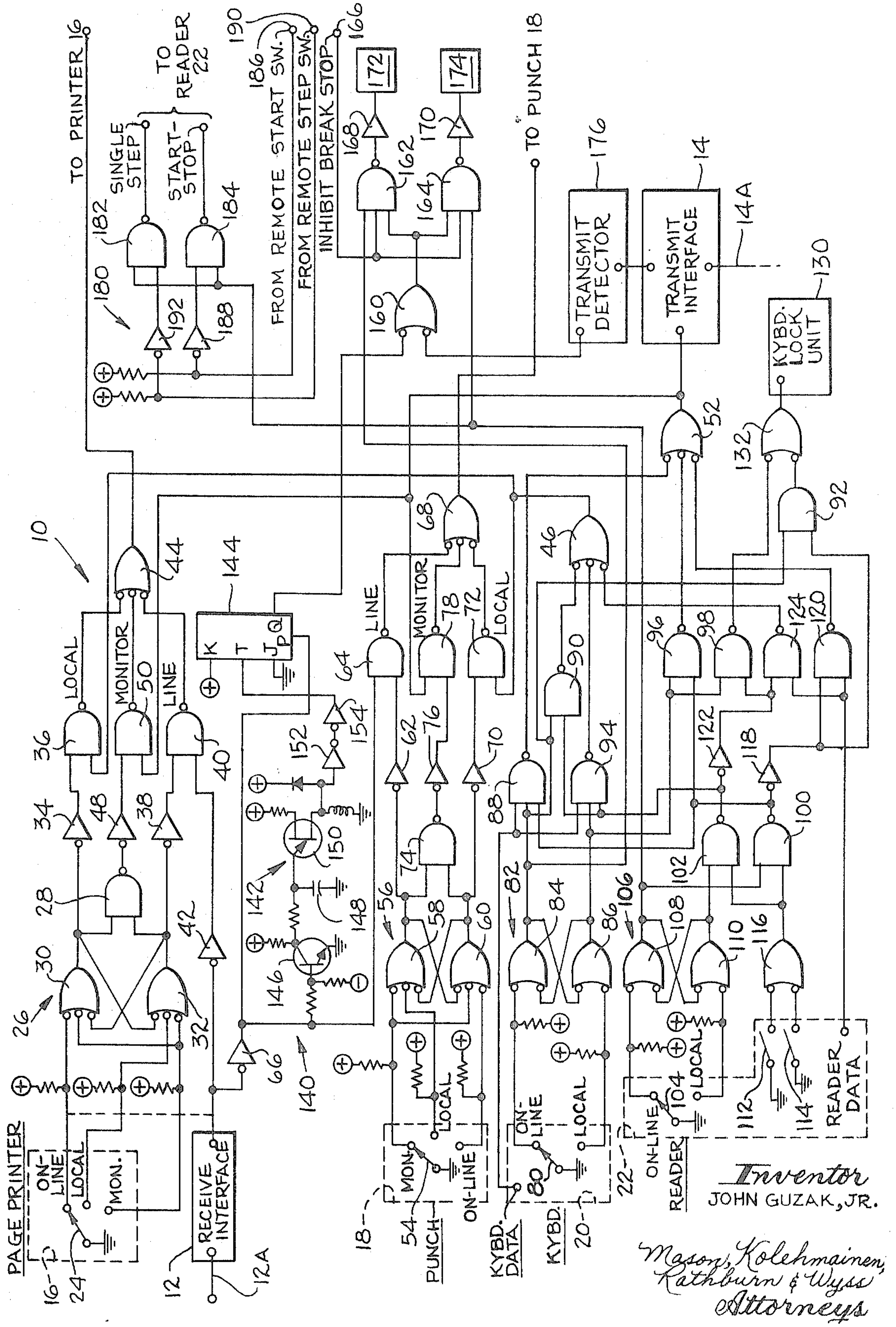
Inventor
JOHN GUZAK, JR.
Mason, Kolehmainen, Rathburn & Wyss
Attorneys

MODING CONTROL FOR A DATA COMMUNICATION SYSTEM

BACKGROUND OF THE INVENTION

This invention relates to a telecommunication system and, more particularly, to a new and improved moding control useful in telegraphic communication systems.

A station in a telegraphic communication system having incoming and outgoing lines and a send-receive set commonly includes both a punch and a printer as data receivers and a keyboard and a reader as data sources or transmitters. A data transmitter can be placed in a local mode in which it serves as a data source to transmit to one of the data receivers in the set or station, or can be placed in an online mode to transmit date over an outgoing line. The data receivers can be placed in an online mode to receive data from an incoming line or in a local mode to receive data of local origin. It is also desirable to be able to place the data receiver in a monitor mode in which it records or monitors data transmitted over an outgoing line by a local data transmitter. To achieve the maximum usage of the data components, it is desirable to provide as complete flexibility in the control of the mode selection of the units as is possible consistent with inhibiting possible data interference, while reducing the size and complexity of the mode control so as to improve portability of the sets and reduce their cost.

SUMMARY

The invention relates to a telecommunication or telegraphic communication system or network including a station consisting of a send-recieve set having incoming and outgoing lines. The set includes a punch and a printer as date receivers and a keyboard unit and a reader as data transmitters. A moding control circuit interrelates the data transmitters and receivers to not only afford complete flexibility as to online and off-line (local) use, but also to permit the use of the data receivers when the data transmitter is in an online mode to provide a home copy of the transmitted material. This is accomplished by the use of logic circuitry controlled by two position selectors in the case of the data transmitters, and three position selectors in the case of the data receivers. The two state selectors for the data transmitters or sources control bistable circuits which in turn effect the selection of the local or online mode. In the case of the data receivers, bistable circuits are also associated with the three state selectors, and the bistable circuits are, in effect, operated to three states of stability to select the online, local, and monitor modes. Through the use of logic circuitry, any possibility of data interference arising from the selection of the modes for the data units is positively inhibited while affording the consistent degree of complete flexibility in mode selection and control.

BRIEF DESCRIPTION OF THE DRAWING

Many other objects and advantages of the present invention will become apparent from considering the following detailed description in conjunction with the drawing which comprises a logic schematic diagram of a telecommunication system including the novel moding control circuit embodying the present invention.

DESCRIPTION OF THE PREFERRED EMBODIMENT

Referring now more specifically to the drawing, therein is illustrated a telecommunication or telegraphic communication system which is indicated generally as 10 and which embodies the novel moding control circuit of the present invention. The system 10 includes a receive interface 12 terminating an incoming line 12A from which data is received, and a transmit interface 14 terminating an outgoing line or channel 14A to which data is supplied. In the illustrated station of the system 10, there is also provided a page printer indicated generally as 16 and a punch indicated generally as 18 which afford data receiving units. The illustrated station also includes a keyboard unit indicated generally as 20 and a tape reader unit indicated generally as 22 which provide data sources or data transmitters. The construction of the receiving and transmitting units 16, 18, 20, and 22 is conventional, as are the incoming and outgoing lines 12A and 14A and the interfaces 12 and 14. The moding control circuit shown in the drawing permits the set operator to associate the printer 16, the punch 18, the keyboard unit 20, and the reader 22 with each other, the incoming line 12, and the outgoing line 14 as desired, while also permitting the printer 16 and the punch 18 to be used to monitor data transmitted over the outgoing channel 14 by the keyboard 20 or the reader 22. This circuit also insures the absence of data interference arising from these associations.

Referring now more specifically to the selection of the mode of operation of the page printer 16, this unit includes a three state selector illustrated as a switch 24 which can be manually or otherwise operated to three settings representing online, local, or monitoring operations. The setting of the switch 24 controls the state of a bistable circuit or flip-flop 26 which is used in conjunction with a NAND gate 28 to effect three levels or states of selection corresponding to the three settings of the selector switch 24. The flip-flop 26 includes a pair of cross-connected NOR gates 30 and 32, the outputs and one input of each of which are cross-connected. The upper input to the NOR gate 30 is connected to the online terminal of the selector switch 24, and the center input to the NOR gate 32 is connected to the local contact of the selector switch 24. The monitor contact of the selector switch 24 is connected to one input of each of the gates 30 and 32.

Assuming that the page printer is to be placed in an online mode to record data received from the incoming line or channel 12A, the selector switch 24 is operated to the illustrated setting, and a low or more negative potential is applied to one input of the NOR gate 30. This drives the output of this gate to a more positive potential which is forwarded through an inverter 34 to apply an inhibiting potential to one input of an AND gate 36. The more positive potential at the output of the NOR gate 30 is returned to the input of the NOR gate 32 to drive the output of this gate to a more negative potential since all of the inputs to this gate are high. The output potential from the gate 32 inhibits one input to the gate 28 and is also forwarded through an inverter 38 to enable one input of a NAND gate 40. The other input to the NAND gate 40 is connected to the receive interface 12 through an inverter 42. Thus, with the NAND gate 40 enabled, the intelligence or data signals received from the interface or line 12 are forwarded through the NAND gate 40 and a NOR gate 44 to be supplied as an intelligence input to the printer 16. Thus, the printer 16, with the selecting means 24 in its online setting, records incoming data received from the interface 12.

When the selecting means 24 is operated to its local setting, the more negative or low potential applied to one input of the NOR gate 32 flips the bistable circuit or flip-flop 26 so that the inverter 38 now applies an inhibiting potential to one input of the NAND gate 40 and the interconnection between the page printer 16 and the receive interface 12 is interrupted. The upper input to the gate 28 is now inhibited by the low output of the gate 30, but this low output is inverted in the inverter 34 and enables the upper input to the gate 36. The other terminal of the gate 36 is connected to the output of a NOR gate 46 which supplies either reader or keyboard data in dependence on whether the keyboard 20 or the reader 22 is rendered effective in a local mode to supply off-line data. The keyboard or reader data supplied at the output of the gate 46 is forwarded through the gates 36 and 44 to the page printer 16.

To condition the page printer 16 for operation in a monitor mode in which it records data supplied to the transmit interface 14 or outgoing line 14A from either the keyboard unit 20 or the reader 22, the selecting means 24 is adjusted to apply a more negative or ground potential to the monitor terminal. This ground potential is supplied to an input of both of the NOR gates 30 and 32 so that the outputs of both of these gates are driven to a more positive potential. The output of the gate 30 is effective through the inverter 34 to inhibit the gate 36, and the output of the gate 32 is effective through the inverter 38 to inhibit the gate 40. Thus, the gate 44 cannot be supplied with either online or local data.

The more positive potential provided at the output of the two gates 30 and 32 fully enables the gate 28 so that the output at this gate drops to a more negative or low potential which is forwarded through an inverter 48 to enable the upper input of a NAND gate 50. The other input to the gate 50 is connected to the output of a NOR gate 52 which output is also connected to the input of the transmit interface 14 and ultimately to the outgoing line 14A. The inputs to the gate 52 are supplied with data originating in either the keyboard unit 20 or the reader 22 in dependence on the settings of the selectors associated with these two units. Thus, the locally generated data signals being supplied through the interface 14 to the outgoing line 14A are also forwarded through the gates 50 and 44 to the page printer 16.

The other data receiving unit or punch 18 includes a moding control substantially identical to that provided for the page printer 16 which is controlled by a three level selector shown as a switch 54 operable to monitor, local, and online settings. Similar to the control for the page printer 16, the selector or switch 54 operates a flip-flop 56 including a pair of cross-connected NOR gates 58 and 60 to three states of stability to provide the monitor, local, and online modes. In the online setting the low output of the gate 58 passes through an inverter 62 to enable one input of a line NAND gate 64, the other input of which is coupled to the output of the receive interface through an inverter 66. The received line signals are repeated through the gate 64 and a NOR gate 68 to be supplied to the punch 18.

When the selector 54 is set Thus, the a local setting, the low output of the gate 60 is forwarded through an inverter 70 to enable one input to a NAND gate 72, the other input of which is connected to the output of the gate 46. Thus, the gate 72 repeats keyboard or reader data through the gate 68 to the punch 18 in dependence on the settings of the selectors associated with these two transmitting units.

In the illustrated monitor setting of the selector 54, the high outputs from the pair of gates 58 and 60 enable a NAND gate 74 so that the low output of this gate is forwarded through an inverter 76 to enable one input to a NAND gate 78, the other output of which is coupled to the output of the gate 52. Thus, the gate 72 repeats keyboard or reader data through the gate 68 to the punch 18 at the same time that this data is being transmitted through the transmit interface 14 to the outgoing line 14A.

As set forth above, both of the data transmitting units, the keyboard unit 20 and the reader 22, are provided with a two level selector to condition the transmitting units for either online or off-line use. The keyboard unit 20 includes a two level selector shown as a switch 80 which is operable to online and local settings to control the state of a flip-flop indicated generally as 82 which includes a pair of cross-connected NOR gates 84 and 86. When the selector 80 is set to the illustrated online setting, the low input from the switch applied to one input of the gate 84 drives the output of this gate to a more positive potential and reduces the output of the gate 86 to a lower potential. The output of the gate 84 enables one input on each of three NAND gates 88, 90, and 92, while the low output of the gate 86 applies an inhibiting potential to one input of each of three NAND gates 94, 96, and 98. The gate 88 is used to supply keyboard data to the transmit interface 14 and thus to the outgoing line or channel 14A when the keyboard selector 80 is in its online setting.

More specifically, the lower input to the gate 88 is normally supplied with a more positive potential from the output of a NAND gate 100. The upper input to the gate 88 is supplied with keyboard data from the keyboard unit 20. Thus, the data supplied by the keyboard unit 20 is supplied through the gate 88 to one input of the gate 52 and is repeated through this gate to the transmit interface 14. As set forth above, the output to the gate 52 also can be supplied through the gate 50 to the page printer 16 and through the gate 78 to the punch 18 when the selectors 24 and 54 respectively are set to their monitor settings.

When the keyboard selector 80 is set to its local setting to enable the keyboard unit 20 to be coupled to one of the local data receivers 16 or 18, the state of the flip-flop 82 is reversed so that the output of the gate 84 applies an inhibiting potential to one input of the gates 88, 90, and 92, and the high output of the gate 86 applies an enabling potential to one input of the gates 94, 96, and 98. The gate 94 is used to supply keyboard data for local or off-line use.

More specifically, the lower input to the gate 94 normally receives a more positive or high potential from the output of a NAND gate 102. The upper input to the gate 94 is supplied with keyboard data from the keyboard unit 20. Thus, the gate 94 repeats keyboard data to one input of the NOR gate 46. The output of this gate can be supplied through the gates 36 or 72 to the page printer 16 and the punch 18 in dependence on the settings of the selectors 24 and 54, respectively.

The reader 22 includes a selector shown as a manual switch 104 operable to online and local settings to condition the data supplied by the reader 22 for online or off-line (local) use, respectively. The switch or selector 104 selectively operates a flip-flop or bistable circuit indicated generally as 106 and including a pair of cross-connected NOR gates 108 and 110 to two different stable conducting states corresponding to the setting of the switch 104. When the selector 104 is operated to its online setting, for example, the high output of the gate 108 enables one input of the gate 100 and the low output of the gate 110 inhibits one input to the NAND gate 102. The gate 100 is used to control the transmission of data from the reader 22 to the outgoing channel 14A when the selector 104 is in its online setting.

More specifically, when the reader 22 is in operation, one control shown as a switch 112 is closed, and when data is provided in a parallel-to-serial converter in the reader 22, a control shown as a switch 114 is closed. When either or both of the switches 112 or 114 is closed, a NOR gate 116 whose inputs are connected to the switches 112 and 114 supplies a more positive enabling potential to the lower inputs of the gate 102 and 100. The gate 102 is inhibited by the flip-flop 106, but the gate 100 is fully enabled so that the more negative potential at its output is forwarded through an inverter 118 to enable one input to the NAND gate 92 and one input to a NAND gate 120. The other input to the gate 120 is connected to the source of data in the reader 22. Thus, the gate 120 repeats the reader data to one input to the gate 52 from which it is supplied both to the transmit interface 14 and to the gates 50 and 78 which are selectively enabled to permit the page printer 16 and the punch 18 to monitor data supplied by the reader 22 to the outgoing channel 14A.

When the reader 22 is to be used off-line or in a local mode, the selector 104 is actuated to its local setting, and the state of the flip-flop 106 is changed so that a high enabling output from the gate 110 is applied to one input of the gate 102, and the low output of the gate 108 inhibits the gate 100. If the reader 20 is in operation so that the gate 116 supplies a more positive output, the gate 102 is fully enabled and provides a low or more negative potential which is forwarded through an inverter 122 to enable one input to the gate 98 and to enable one input to a NAND gate 124. The other input of the gate 124 is supplied with reader data, and thus the gate 124 supplies reader data through the gate 46 to the page printer 16 or the punch 18 in dependence on the settings of the selectors 24 and 54, respectively.

As indicated above, the moding control included in the system 10 is such as to prevent any possibility of data interference arising from attempts to use both the keyboard unit 20 and the reader 22 concurrently in either the online or the local mode. In the illustrated logic, the reader 22 is assigned priority in selection so that when an attempt is made to place both the transmitting units 20 and 22 in the same mode, the reader 22 will be placed in the selected mode, and operation of the keyboard unit 20 is inhibited. More specifically, assuming that both the keyboard unit 20 and the reader 22 are placed in an online mode by moving the selectors 80 and 104 to the illustrated settings, the gate 88 would be enabled to supply keyboard data to one input of the gate 52. However, with the bistable 106 associated with the reader 22 set to supply an enabling potential to the upper input of the gate 100 and if the reader 22 is actually in operation so that one or both of the switches 112, 114 is closed, the output of the gate 100 drops to a negative potential which applies an inhibit to one input of the gate 88. Thus, the gate 88 is inhibited so that keyboard data cannot be supplied to the gate 52, and, at the same time, the output of the gate 100 enables the gate 120 so that reader data is supplied to one input of the gate 52.

Alternatively, if both the keyboard unit 20 and the reader 22 are conditioned for local operation in which keyboard data would normally be forwarded through the gate 94 to one input of the gate 46, the bistable circuit 106 and the gate 116 fully enable the gate 102 so that the more negative potential at its output is applied to the lower input of the gate 94 to inhibit this gate and thus prevent the transmission of keyboard data to the input of the gate 46 and thus to one of the local data receiving units 16 and 18. At the same time, the inverter 122 enables the gate 124 so that the gate 46 receives reader data for off-line use.

The gates 90 and 96 are provided to inhibit the unused one of the NOR gates when both selectors 80 and 104 are set for the same mode. The gate 90 is fully enabled when both of the selectors 80 and 104 are set in an online setting. When the NAND gate 90 is fully enabled, a continuous low level signal is applied to one input of the NOR gate 46 to prevent the transmission of any data to either of the data receivers 16 and 18. Thus, when both transmitters 20 and 22 are online, the local gate 46 is inhibited to prevent any signals from reaching the receivers 16 and 18. Similarly, when both of the selectors 80 and 104 are set to a local setting, both inputs to the gate 96 are enabled, and the output of this gate holds the output of the NOR gate 52 at a high level to prevent the transmission of any signals to the outgoing line 14A.

However, it should be noted that the inhibit selectively supplied to the gates 88 and 94 to prevent the transmission of keyboard data from the outputs of the gates 100 and 102 is dependent on the condition of the switches 112 and 114, and thus, the possibility is provided by which the keyboard unit 20 can provide data with both of the transmitters 20 and 22 in the same mode but the higher priority reader 22 is not actually operating. The actual control by which this operation is achieved is exercised by a keyboard lock unit 130 of a conventional construction which, when energized, locks the keys of the keyboard unit 20 against operation to prevent the transmission of keyboard data during the interval in which the reader data is being supplied only when both transmitters 20 and 22 are in the same mode. This control is so exercised that during the intervals in which reader data is not being supplied, keyboard data can be supplied even though the selectors 80 and 104 are in a similar setting. More specifically, the upper input to the gate 98 is enabled when the selector 80 in the keyboard unit 20 is set to a local condition. The lower input to this gate is enabled when the selector 104 in the reader 22 is in a local setting and the reader 22 is in operation as signified by closure of one or both of the switches 112 and 114. The low level output provided at the gate 98 is effective through a NOR gate 132 to apply more positive signal to the keyboard lock unit 130 which renders the keyboard unit 20 incapable of operation. When, however, the reader 22 is not actually operating, as signified by both of the switches 112 and 114 being open, an inhibiting potential is applied to the lower input of the gate 98 even though the selector 104 remains in its local setting. The output of the gate 98 now rises to a more positive potential, and the keyboard lock unit 130 is released to permit operation of the keyboard unit 20 during the intervals in which the reader 22 is not actually in operation.

Similarly, when the selector 80 in the keyboard unit 20 is set to an online setting, the upper input of the gate 92 is enabled. The lower input to this gate is enabled when the selector 104 is in the online setting and one or both of the switches 112 and 114 is actuated. This fully enables the gate 92 so that a more negative signal is applied to the input of the gate 132 to supply a more positive operating signal to the keyboard lock unit 130. Thus, the keyboard unit 20 is locked against operation during the interval in which the reader 22 is actually operating, However, when both of the switches 112 and 114 are opened and even though the selector 104 remains in an online setting, an inhibiting potential is applied to the lower input of the gate 92 and its output rises to a more positive potential to remove the more positive locking signal from the keyboard lock unit 130. Thus, the keyboard unit 20 can be operated during the interval in which the reader 22 is not in operation even though both selectors 80 and 104 are in an online setting.

The moding control in the system 10 also includes a break stop detector indicated generally as 140 for operating a convention break stop mechanism in the event that the receive line or incoming channel 12A remains in a space condition for more than a predetermined period of time. The detector 140 includes a gated timing circuit indicated generally as 142 and a bistable indicator or JK flip-flop 144 which is set or primed on each space-to-mark transition by the positive-going signal provided at the output of the inverter 66 to a state in which the Q terminal provides a more positive potential.

During a marking condition on the incoming line 12A, a more positive potential is applied to the base of a transistor 146 to place this transistor in a conductive condition. However, when the incoming line 12A is placed in a space condition, a more negative potential is applied to the base of the transistor 146, and this transistor returns to a nonconductive state so that a capacitor 148 begins to charge. After a delay interval on the order of 300 milliseconds, the capacitor 148 is sufficiently charged in a positive direction to trigger a unijunction transistor 150 into a conductive condition, and the transistor 150 provides a positive-going pulse which passes through a pair of inverters 152 and 154 to be applied to the toggle or clock input of the flip-flop 144. This pulse toggles the flip-flop 144 to the conductive state represented by the input potentials applied to the J and K terminals so that the Q terminal drops to a more negative potential. The time delay between the time at which the transistor 146 is initially placed in a nonconductive condition and the time at which the flip-flop 144 is clocked can be adjusted to any suitable value.

The negative-going signal provided at the Q terminal of the flip-flop 144 is effective through a NOR gate 160 to apply a more positive potential to one input of each of a pair of NAND gates 162 and 164. Another input to each of the gates 162 and 164 is normally supplied with a positive enabling potential from an inhibit break stop terminal 166. The other input to the gate 162 is connected to the output of the gate 84 and receives a positive enabling potential when the keyboard unit 20 is placed in an online mode by its selector 80. The other terminal of the gate 164 is connected to the output of the gate 106 and receives a positive enabling potential when the reader is placed in an online mode by the selector 104. Thus, whenever the break stop detecting circuit 140 detects an open incoming line, the more positive signal provided at the output of the gate 160 fully enables one or both of the gates 162 and 164 in dependence on the setting of the mode selectors 54 and 104.

The more negative output provided at the outputs of the gates 162 and 164 is forwarded through a pair of inverters 168 and 170, respectively, to a keyboard break stop mechanism 172 and a reader break stop mechanism 174. The negative-going signal supplied to the break stop units or indicators 172 and 174 actuates these units to provide an indication that an open line has been encountered.

The outgoing channel or line 14A is also monitored for an open line by transmit detector 176 which is coupled to the transmit interface 14. The output of the transmit detector 176 is coupled to an input of the NOR gate 160 so that whenever an open line condition is detected on the outgoing line 14A, one or both of the gates 162 and 164 is fully enabled to actuate the break stop mechanisms 172 and 174 in dependence on the settings of the mode selectors 54 and 104.

The system 10 also includes a control circuit 180 for rendering a remote control unit effective to control the operation of the reader 22. The control circuit 180 includes a pair of NAND gates 182 and 184, one input of each of which is supplied with an enabling potential from the output of the gate 108 whenever the reader 22 is placed in an online mode by the selector 104. When a remote start switch (not shown) is actuated, a more negative potential is applied to a terminal 186, and this signal is forwarded through an inverter 188 to enable the other terminal of the gate 184. The more negative potential provided at the output of the gate 184 is applied to the reader 22 to provide a start stop control. Similarly, when a remote step switch (not shown) is actuated, a more negative potential is applied to a terminal 190 which is forwarded through an inverter 192 to complete the enabling of the gate 182. The more negative output of the gate 182 is supplied to the reader indicating that a single set operation of the reader 22 is to be performed. When the selector 104 in the reader 22 is operated to its local setting, the more negative potential at the output of the gate 108 inhibits the gates 182 and 184 and prevents remote control of the reader 22.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

I claim:

1. In a communication system of the type having data receiving and data transmitting units and incoming and outgoing lines, first selecting means for each data transmitting unit operable to different first and second settings, first control circuit means controlled by the first selecting means in said first setting for coupling the data transmitting unit to an outgoing line and in said second setting to couple said data transmitting unit to a data receiving unit, second selecting means for each data receiving unit operable to first, second, and third settings, second control circuit means controlled by the second selecting means in said first setting for coupling the data receiving unit to an incoming line, in said second setting for coupling the data receiving unit to one of the data transmitting units, and in said third setting for coupling the data receiving unit to the outgoing line, and control means included in the first control circuit means for preventing the coupling of more than one data transmitting unit with either the outgoing line or one of the data receiving units.

2. The combination set forth in claim 1 in which the first control circuit means includes both a bistable circuit having set and reset inputs and means controlled by the first selecting means for controlling one of the inputs in said first setting and the other of the inputs in said second setting.

3. The combination set forth in claim 1 in which the second control circuit means includes both a bistable circuit having set and reset inputs and means controlled by the second selecting means for controlling different ones of the inputs in two of said first, second, and third settings and for controlling both of said inputs in the remaining one of said first, second, and third settings.

4. In a communication system having a data receiver, an incoming line, and outgoing line, and a data transmitter, a single selecting means operable to different first, second, and third settings, and a control circuit coupled to and controlled by the selecting means for coupling the data receiver to different ones of the data transmitter, the incoming line, and the outgoing line in different ones of the first, second, and third settings of the selecting means.

5. The combination set forth in claim 4 in which the control circuit includes a pair of cross-coupled logic circuits operable to alternate conductive conditions in two of said settings and to like conductive conditions in the third setting.

6. The combination set forth in claim 5 in which the control circuit includes a third logic circuit coupled to the outputs of both of the cross-coupled logic circuits and responsive to the like conductive conditions of the cross-coupled logic circuits in said third setting for providing an output signal representing the operation of the selecting means to said third setting only when said like conductive conditions are established.

7. In a communication system having an outgoing channel over which data is transmitted;

first and second transmitters each having a break stop unit;

first and second selectors each coupled to one of the transmitters, each of said selectors having a first setting in which the coupled one of the transmitters is incapable of supplying data to the outgoing channel and being operable to a second setting to render the coupled one of the transmitters effective to supply data to the outgoing channel;

a single detector coupled to the channel;

and means coupled to the signal detector and the first and second selectors and controlled by the first and second selectors for rendering the signal detector effective to control the break stop units in different ones of the first and second transmitters in dependence on which of the first and second selectors are in their second setting.

8. In a communication system having a signaling channel;

a first data transmitter;

a second data transmitter;

a first selector coupled to the first transmitter and operable to a first setting to render the first transmitter effective to supply data to the signaling channel and to a second setting in which the first transmitter is ineffective to supply data to the signaling channel;

a second selector coupled to the second transmitter and operable to a first setting to render the second transmitter effective to supply data to the signaling channel and to a second setting to render the second transmitter ineffective to supply data to the signaling channel;

a control circuit coupled to and controlled by the first and second selectors when both of said first and second selectors are in said first setting for inhibiting transmission of data to the channel by the first transmitter while permitting transmission of data to the channel by the second transmitter, a data responsive means for determining when the second transmitter is actually supplying data to the channel;

and means in said control circuit controlled by the data responsive means for removing the inhibition from the first transmitter during the interval in which the second transmitter is not actually supplying data to the channel and while both of the first and second selectors remain in their first settings, thereby to permit the first transmitter to supply data to the channel during this interval.

9. The combination set forth in claim 8 in which the first data transmitter is a keyboard controlled unit, and the control circuit includes means for locking the keyboard controlled unit against operation.